(12) United States Patent
Reshetov et al.

(10) Patent No.: US 7,786,991 B2
(45) Date of Patent: *Aug. 31, 2010

(54) APPLICATIONS OF INTERVAL ARITHMETIC FOR REDUCTION OF NUMBER OF COMPUTATIONS IN RAY TRACING PROBLEMS

(75) Inventors: Alexander V. Reshetov, Saratoga, CA (US); Alexei M. Soupikov, Nizhny Novgorod (RU); Alexander D. Kapustin, Nizhny Novgorod (RU); James T. Hurley, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 12/042,163

(22) Filed: Mar. 4, 2008

(65) Prior Publication Data

US 2008/0150944 A1    Jun. 26, 2008

Related U.S. Application Data

(63) Continuation of application No. 11/024,527, filed on Dec. 28, 2004, now Pat. No. 7,348,975.

(51) Int. Cl.
   *G06T 15/00*    (2006.01)
(52) U.S. Cl. ............... 345/420; 345/419; 345/421
(58) Field of Classification Search .......... 345/418, 345/419, 420, 421
   See application file for complete search history.

(56) References Cited

U.S. PATENT DOCUMENTS

| 5,058,042 | A | | 10/1991 | Hanna et al. |
| 5,729,704 | A | * | 3/1998 | Stone et al. ............ 715/804 |
| 6,429,864 | B1 | | 8/2002 | Schwarzer |
| 6,750,859 | B2 | | 6/2004 | Sowizral et al. |
| 7,098,907 | B2 | | 8/2006 | Houston et al. |
| 2002/0033835 | A1 | | 3/2002 | Sowizral et al. |
| 2003/0184546 | A1 | | 10/2003 | Kitamura |

OTHER PUBLICATIONS

Wang et al., "An Efficient and Stable Ray Tracing Algorithm for Parametric Surfaces", Journal of Information Science and Engineering 18, 541-561 (2001).
Yu et al., "A Study on Improved Grid Traversal Algorithm for Ray Tracing", Master's Thesis, Chung-Yuan Christian University, 2000.
Taiwan Patent Office, Office Action for correspondence Taiwan Application No. 94146762, 4 pages, May 14, 2008.

(Continued)

*Primary Examiner*—Phu Nguyen
(74) *Attorney, Agent, or Firm*—Trop, Pruner & Hu, P.C.

(57) ABSTRACT

Embodiments provide for ray tracing traversal that relies on selected geometrical properties of the application to reduce the number of operations required during each traversal step. The traversal algorithm does not depend on the number of rays in the group. As a result, multi-level traversal schemes may be implemented, starting with a large number of rays in a group and then reducing it as needed to maintain group coherency. Multi-level traversal schemes may be created by splitting large groups of rays while traversing acceleration structures.

7 Claims, 3 Drawing Sheets

OTHER PUBLICATIONS

PCT International Search Report (dated May 18, 2006), International Application No. PCT/ US2005/047701—International Filing Date Dec. 29, 2005, [File No. P19888PCT], (13 pages).

Wilhelm Barth, et al., "Ray Tracing General Parametric Surfaces Using Interval Arithmetic", The Visual Computer International Journal of Computer Graphics, Springer International, Berlin, DE, vol. 10, No. 7 (1994), XP008030167, ISSN: 0178-2789 (pp. 363-371).

Adrian Bowyer, et al., "Interval Methods in Geometric Modeling", Geometric Modeling and Processing 2000, Theory and Applications, Proceedings Hong Kong, China Apr. 10-12, 2000, Los Alamitos, CA, USA, IEEE Comput. Soc., US, Apr. 10, 2000 (XP 010377961, ISBN: 0-7695-0562-7 (pp. 321-327).

J. F. Sanjuan-Estrada, et al., "Reliable Algorithms for Ray Intersection in Computer Graphics Based on Interval Arithmetic", Computer Graphics and Image Processing (2003), XVI Brazilian Symposium on Oct. 12-15, 2003, Piscataway, NJ, USA, IEEE Oct. 12, 2003, XP010664266, ISBN: 0-7695-2032-4 (pp. 1-8).

Gerd Marmitt, et al., "Fast and Accurate Ray-Voxel Intersection Techniques for Iso-Surface Ray Tracing", Vision, Modeling, and Visualization 2004 (VMV 2004), Stanford, USA, Nov. 16-18, 2004, XP002378437 (pp. 429-435).

Hanan Samet, et al., "Hierarchical Data Structures and Algorithms for Computer Graphics"—Part I: Fundamentals, IEEE Computer Graphics and Applications, IEEE Service Center, NY, USA, vol. 8, No. 3 (May 1988), XP000006955, ISSN: 0272-1716 (pp. 48-68).

Hanan Samet, et al., "Hierarchical Data Structures and Algorithms for Computer Graphics", Part II: Applications, IEEE Computer Graphics and Applications, IEEE Service Center, NY, USA (Jul. 1988), XP001098905, ISSN: 0272-1716 (pp. 59-75).

* cited by examiner

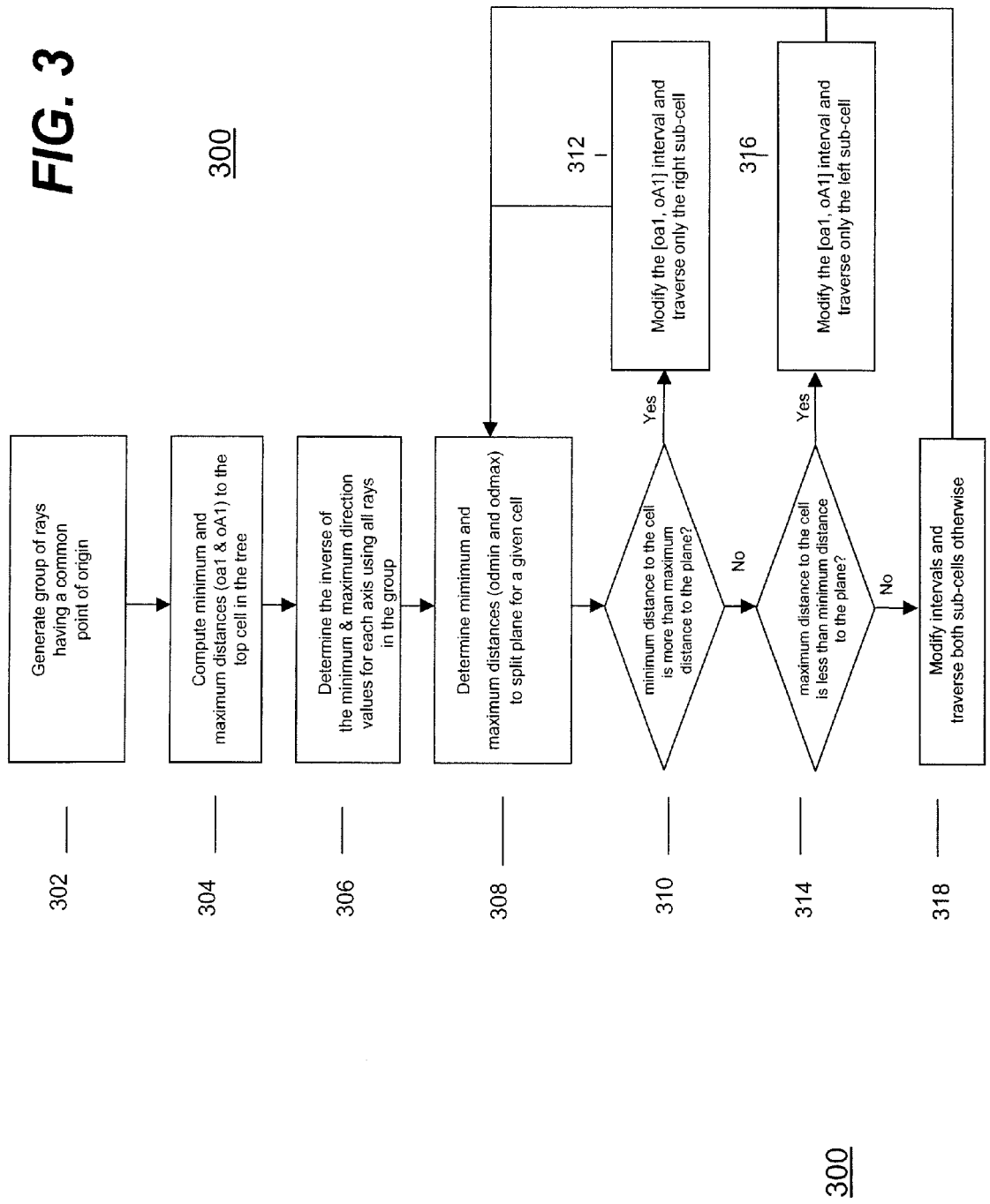

APPLICATIONS OF INTERVAL ARITHMETIC FOR REDUCTION OF NUMBER OF COMPUTATIONS IN RAY TRACING PROBLEMS

This is a Continuation application of application Ser. No. 11/024,527, filed Dec. 28, 2004, now U.S. Pat. No. 7,348,975 entitled "Applications of Interval Arithmetic for Reduction of Number of Computations in Ray Tracing Problems", (Publication No. US 2006-0139340 A1).

BACKGROUND

Implementations of the claimed invention generally may relate to ray tracing and, more particularly, to interval arithmetic for ray tracing.

Ray tracing is a well know method used in modeling of a variety of physical phenomena related to wave propagation in various media. For example it is used for computing an illumination solution in photorealistic computer graphics, for complex environment channel modeling in wireless communication, aureal rendering in advanced audio applications, etc.

A ray is a half line of infinite length originating at a point in space described by a position vector which travels from said point along a direction vector. Ray tracing is used in computer graphics to determine visibility by directing one or more rays from a vantage point described by the ray's position vector along a line of sight described by the ray's direction vector. To determine the nearest visible surface along that line of sight requires that the ray be effectively tested for intersection against all the geometry within the virtual scene and retain the nearest intersection.

When working with real values, data is often approximated by floating-point (FP) numbers with limited precision. FP representations are not uniform through the number space, and usually a desired real value (i.e. ⅓) is approximated by a value that is less than or greater than the desired value. The error introduced is often asymmetrical—the difference between the exact value and the closest lower FP approximation may be much greater or less than the difference to the closest higher FP approximation. Such numerical errors may be propagated and accumulate though all the computations, sometimes creating serious problems.

One way to handle such numerical inaccuracies is to use intervals instead of FP approximations. In this case, any real number is represented by 2 FP values: one is less than the real one, and another is greater than the real one. The bound values are preserved throughout all computations, yielding an interval, which covers the exact solution. Usually, applications using interval arithmetic are limited to certain classes of workloads (such as quality control, economics or quantum mechanics) where the additional costs of such interval computations significantly outweigh the implications of dealing with inexact FP numbers for any final values.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings

FIG. 3 is a flow chart illustrating a process of traversing multiple rays through a binary tree using an interval technique.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Embodiments provide for ray tracing traversal that relies on selected geometrical properties of the application to reduce the number of floating point (or other data type operations such as integer, fixed point) operations required during each traversal step. The interval traversal algorithm does not depend on the number of rays in the group. Multi-level traversal schemes may be implemented, starting with a large number of rays in a group and then reducing it as needed to maintain group coherency. Additional rays may be generated during traversal to improve anti-aliasing properties of the resulting image in areas of high geometrical complexity. The interval traversal algorithm groups parallel geometrical queries, extracts selected common geometrical characteristics pertinent for the whole group, and then executes a query using only these characteristics (and not the whole group). Ray tracing is based on massively parallel geometrical queries, executed against some spatially ordered geometrical database. The interval traversal algorithm may be extended to cover other types of applications, where it may be possible to find and trace certain group properties against a specialized database. One skilled in the art will recognize that embodiments of the invention are not limited to floating point implementation. Rather, the embodiments of the invention may be implemented using various data types, including but not limited to integer, fixed point and so forth.

Figure 1:
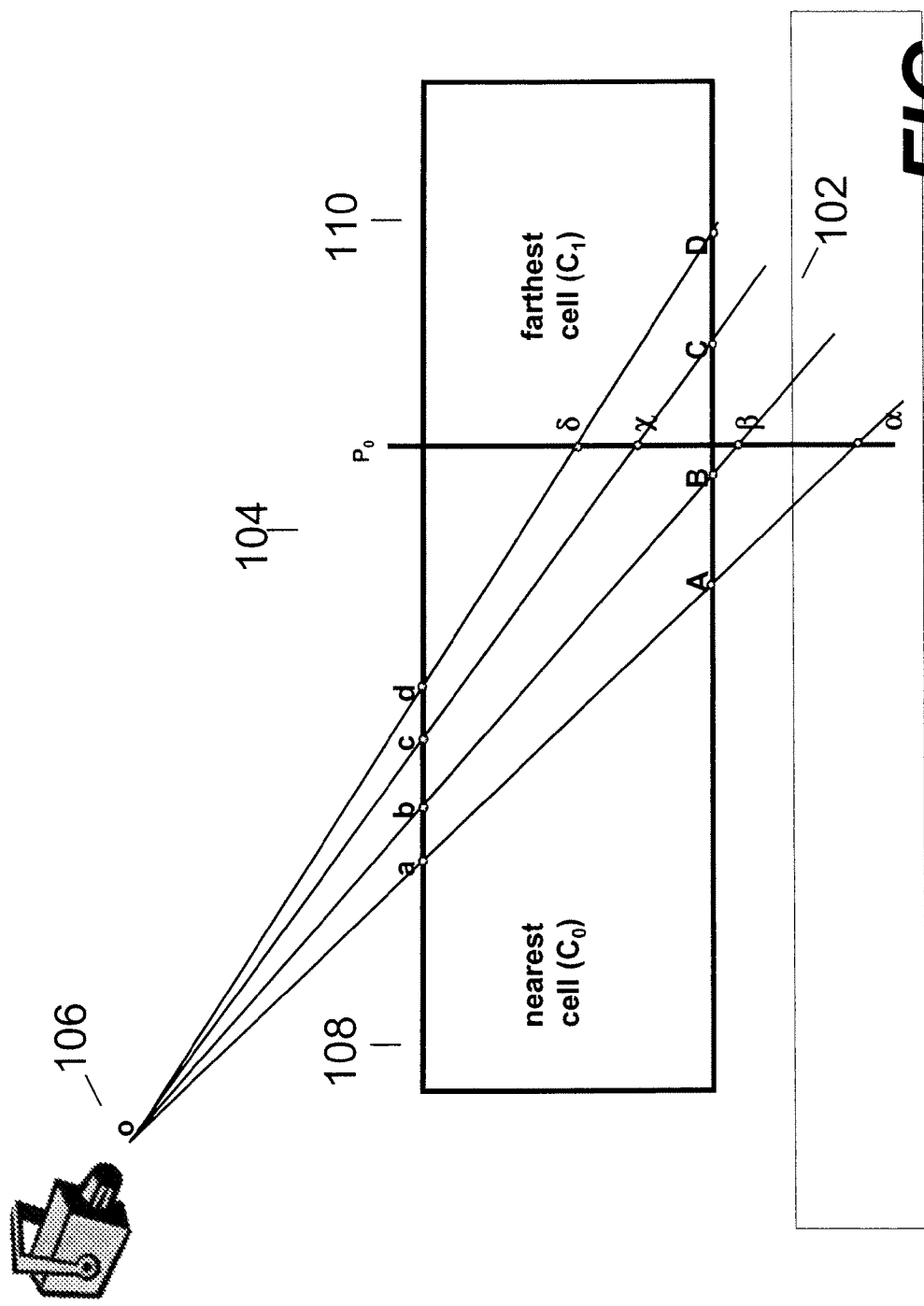
FIG. 1 illustrates an example of multiple rays traced through a cell from a common origin, executed during traversal of a binary tree.

FIG. 1 illustrates an example 100 of multiple rays 102 traced through a cell 104 from a common origin 106 for traversal of a binary tree. One cell 104 is split into two sub-spaces including a nearest cell C0 108 and farthest cell C1 110 by split plane P0. Rays 102 may be shot through pixels on the screen into a database representing all of the objects in a scene. These objects (suitably sub-divided) and data may represent empty space, and may be stored in a hierarchical spatial partitioning structure. Shooting a ray 102 involves tracing the path the ray 102 may take through this structure. Opportunities for parallelism exist but are limited, as each ray may take a different path through the database, and since the data structure is hierarchical, there is a sequential dependency as the ray goes from one level to the next.

The database may represent the distribution of objects and empty space as a collection of axis aligned spatial intervals. A collection of rays may be directly tested against any arbitrary level of the database hierarchy (i.e. not necessary starting at the top). The bundles of rays may be subdivided proceeding down the structure.

This results in improved numerical fidelity and simplifies the process of tracing rays. In particular, the number of operations required per ray is reduced, resulting in an improvement in overall application performance. Furthermore, hardware may be designed to directly implement such interval arithmetic, allowing additional performance improvement. Shooting of rays is not particular to graphics, similar technology may also used to track the propagation of waves of various kinds, calculating radar cross sections for military purposes etc.

In a ray tracing environment, it may be required to shoot lots of rays. One way to accomplish this is to determine the intersection of all rays against all of the polygons that define all of the geometrical objects in the scene.

Another way to accomplish this is to partition all of these polygons into an axis aligned partitioning structure. One implementation of this is to split the entire scene up into a uniform grid of cubes, while replicating polygons that straddle the cube boundaries. A ray may be shot and the cubes the ray passes through predicted. The ray is only tested against the contents of each of these cubes, ignoring the rest. Due to the relative efficiency of using such a representation versus testing every ray against every polygon, the term "acceleration structure" may be used to describe any such data structure designed to reduce the total number of ray-polygon intersection tests.

The above uniform grid of cubes has the advantage that the trajectory of a ray through the cubes may be calculated easily, and the relevant data accessed directly. The detail in the scene may not be distributed evenly though. For example, a huge amount of polygons may end up in one cube, and very little detail in the others.

Another acceleration structure construct is commonly referred to as a kd-tree. In this acceleration structure, some cost function may be used to recursively split the scene by axis-aligned planes. Initially, the scene may be split in two by such a plane, each half may then be split again along some other plane, and so forth. This results in a hierarchical organization of the structure. Each level of the acceleration structure may be recursively traversed to determine where the next level of the structure can be found. Cost functions are carefully chosen in the construction phase of these structures to achieve optimum performance while traversing these trees later when shooting the various rays needed for visualization.

The leaf nodes of a kd-tree represent a small axis aligned cell wherein there is some number of polygons. At the next level up the tree, each node represents an axis aligned box which is completely filled by two of the leaf nodes (a "split-plane" splits the larger volume into the two leaf cells). At the next level, each node represents an axis aligned box completely filled by two of the lower level nodes using a similar split-plane and so on. The tree is not required to be balanced, that is any internal node may be split into leaf node and another internal node. At any given level, a ray may be intersected against the bounding box to determine whether: (1) the ray completely misses the box, (2) the ray hits the box and passes through the "left" sub-node—i.e. to the "left" of the split-plane, (3) the ray hits the box and passes through the "right" sub-box, or (4) the ray hits and passes through both of the sub-boxes. In the first case (1), the further processing of the lower level nodes is no longer necessary, as the ray "misses" the entire lower part of the tree.

Embodiments of the invention are applicable to many acceleration structures, including those that use separation planes to determine which objects have to be tested for a particular ray. These acceleration structures include but are not limited to grids, bounding boxes and kd-trees.

Referring to FIG. 1, For any given block of rays, the traversal algorithms determine if the rays 102:

(1) pass through subspace 108 to the left of the split-plane 104;

(2) pass through the subspace 110 to the right of the split-plane 104; or (3) passes through both sub-spaces 108 and 110.

During full traversal of a binary tree, for each ray 102, the cell entry and exit points are known. These are the distances represented by oa, ob, oc, od, and oA, oB, oC, oD which are known from previous computations. The intersection points with the split-plane $P_0$ are calculated. They are represented as distances $o\alpha$, $o\beta$, $o\chi$, and $o\delta$. Entry and exit distances are compared with the plane intersection. For example, referring to FIG. 1, rays oa and ob will go only through the left cell 108, while rays oc and od go through both cells 108 and 110. The process is repeated for each subsequent cell that the rays pass through.

If the algorithm requires ray traversal of both cells 108 and 110, then all information, pertinent to the farthest cell such as 110, is stored in a stack-like structure. It includes, in particular, the distances to the entry points $o\chi$ and $o\delta$ and the exit points oC and oD. The nearest cell 108 is recursively traversed first by executing all of the steps of the current process with entry points a, b, c, and d and exit points A, B, $\chi$, and $\delta$. Once all cells within the nearest one have been traversed, the farthest cell data 110 is retrieved from the stack and the whole process is repeated.

If some cell contains primitive objects (such as triangles), the remaining rays which pass through this cell are tested against these objects. For example, ray/triangle intersection tests are performed.

In some cases, for each ray, a primitive object has been discovered such that the distance to it is less than the distance to the current cell. In this case, subsequent traversal steps are not necessary. If ray tracing is being used for rendering purposes, this refinement may be used if such a primitive object is opaque.

Figure 2:
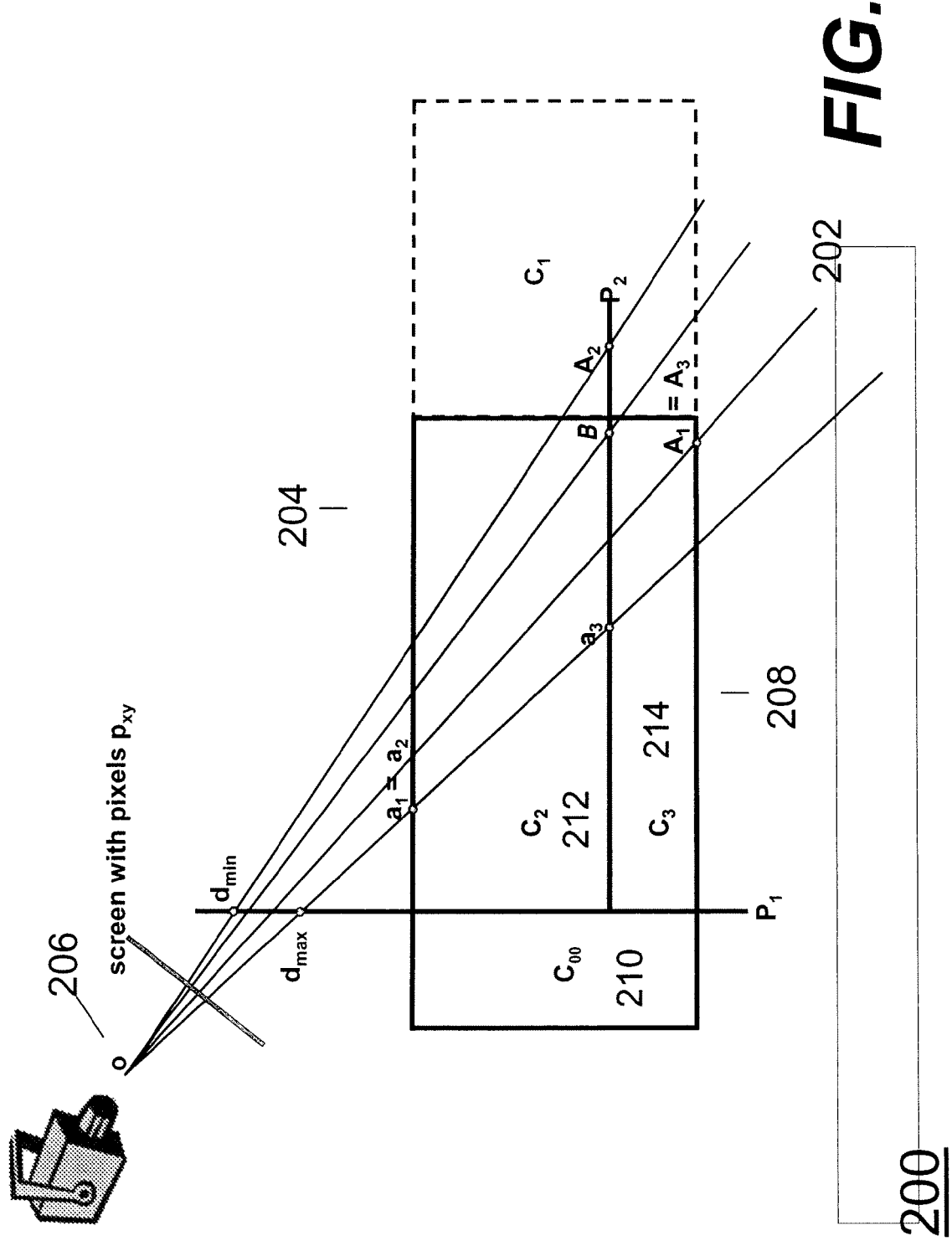
FIG. 2 illustrates an example of interval implementation of traversing multiple rays through a binary tree.

FIG. 2 illustrates an example 200 of multiple rays 202 traced through a cell 204 from a common origin 206 for interval traversal of a binary tree. FIG. 2 shows the next traversal step after the cell is split. In particular, FIG. 1 shows the case where one cell is split into two subspaces $C_0$ 108 and $C_1$ 110 by split-plane $P_0$. In FIG. 2, $C_0$ 208 is further split into $C_{00}$ 210 and the union of $C_2$ 212 and $C_3$ 214. No ray 202 intersects the nearer sub-space $C_{00}$ 210.

The interval traversal algorithm is built upon the calculation and maintenance of one single interval for a group of rays, which includes minimum and maximum distances for all the rays in the bunch from a selected point (camera position) to a particular cell. Instead of representing individual rays as 3D vectors pointing in particular directions, a collection of rays may be represented as a single 3D vector of intervals pointing approximately in some particular direction. Typically, the more coherent these rays are, the tighter the intervals may be. For each coordinate x, y, and z, this interval may be defined as minimum and maximum coordinate value among all rays. Similarly, the individual cells of the acceleration structure may be represented as intervals in x, y and z. Cells at any level of a hierarchical acceleration structure may be represented as such an interval. Upon traversing deeper into the acceleration structure, the vector of intervals representing one group of rays may be sub-divided into multiple groups of rays for efficiency. Higher degrees of ray coherency are typically found deeper in the acceleration structure.

FIG. 3 is a flow chart illustrating a process 300 of interval traversal of a binary tree. Although process 300 may be described with regard to FIG. 2 for ease of explanation, the claimed invention is not limited in this regard. Acts 302, 304, and 306 of the FIG. 3 are executed once per traversal step, while acts 308-316 are executed for each traversed cell.

In act 302, a group of rays is generated and some common characteristics of the group of rays are computed. For those rays generated from a particular common point of origin such as camera position o through a screen with pixels $p_{xy}$, the following are computed for each coordinate axis:

In act 304, the minimum and maximum distance values among all projections of direction vectors $op_{xy}$ on any given axis are computed. By definition, for every ray in the group, the x, y, and z coordinates of $op_{xy}$ vector will be inside an appropriate interval. At the beginning of the top cell traversal (act 304), the minimum and maximum distances $oa_1$ and $oA_1$ are determined. These may be designated as interval $[oa_1, oA_1]$. This interval is maintained and potentially modified (narrowed) during the remaining traversal process. By definition, for any ray in the group, the distance to the nearest cell entry point is not less than $oa_1$ and the distance to the farthest cell exit point is less or equal to $oA_1$.

In act 306, inverse direction intervals are defined.

In act 308, the minimum and maximum distances to the split plane $od_{min}$ and $od_{max}$ may be computed using inverse direction intervals defined in act 306.

As shown in FIG. 2, sub-cells $C_2$ 212 and $C_3$ 214 are split by plane $P_2$. It is determined whether both sub-cells $C_2$ 212 and $C_3$ 214 are traversed. In particular, this is determined by evaluating the following two conditions, which if satisfied, result in traversing only one sub-cell:

In act 310, if the minimum distance to the cell ($oa_1$) is more than maximum distance to the plane ($oA_2$), the $[oa_1, oA_1]$ interval is modified and only the right sub-cell is traversed (act 312).

In act 314, if the maximum distance to the cell ($oA_1$) is less than minimum distance to the plane ($oa_3$), the [oa1, oA1] interval is modified and only the left sub-cell is traversed (act 316).

If neither of these conditions are true, both sub-cells have to be traversed (act 318) and appropriate intervals have to be modified. As shown in FIG. 2, during $C_2$ traversal, the interval will be $[oa_1, oA_2]$. For the cell $C_3$, it will be $[oa_3, oA_1]$.

One skilled in the art will recognize that different implementations of the interval traversal embodiments described herein are possible. For example, embodiments described can be extended to ray groups which do not have a common origin. Although process 300 may be implemented on modern vector or SIMD (Single Instruction Multiple Data) machines, the claimed invention is not limited in this regard.

Certainly, different implementations of the interval traversal algorithm are possible. One, provided above, is used only for presentation purposes, as well as particular cases featured on the supplied figures. It is also possible to extend the ideas, outlined here, to a more general case of ray bunches, which do not have common origin. The following observation helps to understand the differences between the full and the interval traversal algorithms. The full algorithm basically implements simultaneous bounding box clipping of a particular group of rays. For any given cell, reached in the acceleration structure, the entry and exit points for all rays are known. The interval algorithm shown in FIG. 3 represents a lazy distributed box clipping, yielding guaranteed minimum and maximum clipping distances for the whole group of rays.

Embodiments of the invention may sharply reduce the number of floating point or other data type operations required during each traversal step. Unlike the full traversal algorithm, the interval traversal algorithm does not depend on the number of rays in the group. Multi-level traversal schemes may be implemented starting with a large number of rays in a group and then reducing it as needed to maintain group coherency. The interval traversal algorithm, if implemented or supported in hardware, may enable a sharp reduction of power, consumed by the device, as well as increasing overall performance. Ray tracing is based on massively parallel geometrical queries, executed against some spatially ordered geometrical database. The interval traversal algorithm consists of grouping such queries, extracting certain common geometrical characteristics, pertinent for the whole group, and then executing a query using only these characteristics (and not the whole group). As such, the interval traversal approach may be extended to cover other types of applications, where it may be possible to find and trace certain group properties against a specialized database.

Although systems are illustrated as including discrete components, these components may be implemented in hardware, software/firmware, or some combination thereof. When implemented in hardware, some components of systems may be combined in a certain chip or device.

Although several exemplary implementations have been discussed, the claimed invention should not be limited to those explicitly mentioned, but instead should encompass any device or interface including more than one processor capable of processing, transmitting, outputting, or storing information. Processes may be implemented, for example, in software that may be executed by processors or another portion of local system.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. A computer-readable non-transitory medium including storing instructions thereon that, when executed by a processor-based device, cause the processor-based device to:

generate a group of rays that traverse a cell;

determine intersection points of the group of rays with the cell to define a traversal interval;

determine intersection points for the group of rays with a plane that splits the cell into sub-cells;

compare the cell intersection points with the plane intersection points to determine which sub-cells are traversed by the group of rays; and modify the traversal interval based on the comparison.

2. The computer-readable non-transitory medium as recited in claim 1, further causing the processor-based device to generate the group of rays from a common origin.

3. The computer-readable non-transitory medium as recited in claim 2, further causing the processor-based device to determine minimum and maximum distances between the common origin and the cell.

4. The computer-readable non-transitory medium as recited in claim 3, further causing the processor-based device to determine minimum and maximum distances between the common origin and the plane.

5. The computer-readable non-transitory medium as recited in claim 1, further causing the processor-based device to use anti-aliasing techniques to generate rays in areas of high geometrical complexity.

6. The computer-readable non-transitory medium as recited in claim 1, further causing the processor-based device to use the interval and the modified interval to execute a query against a spatially ordered geometrical database.

7. A system, comprising:
a memory including a spatially ordered geometrical database; and
a controller to generate a group of rays that traverse a cell, determine intersection points of the group of rays with the cell to define a traversal interval, determine intersection points for the group of rays with a plane that splits the cell into sub-cells, compare the cell intersection points with the plane intersection points to determine which sub-cells are traversed by the group of ray, modify the traversal interval based on the comparison, and execute a query against the geometrical database by using at least one of the interval and the modified interval.

* * * * *